[11] 3,629,601

| | | |
|---|---|---|
| [72] | Inventor | Arthur H. Firester<br>Kendall Park, N.J. |
| [21] | Appl. No. | 37,646 |
| [22] | Filed | May 15, 1970 |
| [45] | Patented | Dec. 21, 1971 |
| [73] | Assignee | The United States of America as represented by the Secretary of the Army |

[54] HIGH-RESOLUTION OPTICAL UPCONVERTER
10 Claims, 2 Drawing Figs.

[52] U.S. Cl............................................... 307/88.3,
250/83.3 HP
[51] Int. Cl................................................ H03f 7/00
[50] Field of Search........................................... 307/88.3;
250/83.3 HP

[56] References Cited
UNITED STATES PATENTS
3,517,983   6/1970   Fein et al...................... 250/83.3 HP OTHER REFERENCES
Warner, " Journal of Quantum Electronics," June 1969, pp. 354–355.
Andrews, " Journal of Quantum Electronics," June 1969, pp. 355–356.
Firester, " Journal of Applied Physics," Nov. 1969, pp. 4849–4853.

*Primary Examiner*—John Kominski
*Assistant Examiner*—Darwin R. Hostetter
*Attorneys*—Harry M. Saragovitz, Edward J. Kelly and Herbert Berl ABSTRACT: An optical upconverter having a pump source, an object source, a nonlinear optical material, and a filter for passing the sum of the pump and object frequencies. A dichroic mirror or beam splitter and the pump are arranged such that the pump source appears to the entrance face of the nonlinear material to be a point source located at the object plane. The phase matching acceptance angle of the nonlinear optical material is greater than the maximum angle formed between the pump rays and the object rays for spaced points on the object.

INVENTOR.
ARTHUR H. FIRESTER

HIGH-RESOLUTION OPTICAL UPCONVERTER

The present invention relates to image converters and the like and more particularly to optical upconverters using nonlinear optical materials.

In the fields of thermography, night surveillance, night communication, etc., it has been the general practice to employ devices such as image converters for the purpose of converting infrared images into visible images. The optical upconverter shifts the frequency of the object beam into the visible light region, by mixing the object beam and a pump beam in a nonlinear optical material.

One of the most critical problems confronting designers of optical upconverters has been the problems of increasing optical resolution. The general purpose of this invention is to provide an optical upconverter having an optimized resolution. To attain this, the present invention contemplates a unique arrangement of elements, whereby the angle between the wavevectors of the pump beam and the object beam are minimized.

It is therefore the primary object of the present invention to provide a high resolution optical upconverter.

The exact nature of this invention as well as other objects and advantages thereof will be readily apparent from consideration of the following specification relating to the annexed drawing in which.

Figures 1, 2:
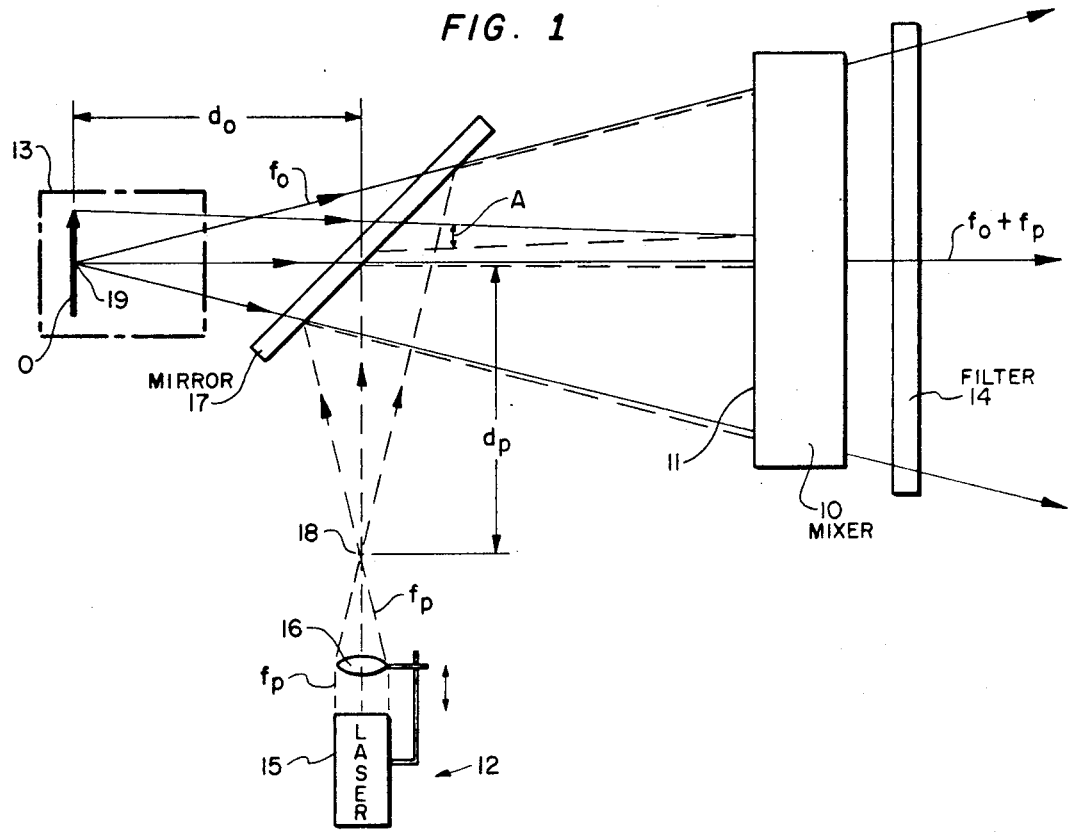
FIG. 1 is diagrammatic view of one species of the invention.
FIG. 2 is a diagrammatic view of another species of the invention.

Referring now to the drawings, there is shown in FIG. 1 an optical upconverter including an optically nonlinear material 10, a pump source 12, am object source 13 and an output filter 14. The nonlinear material 10 may be any of the well-known crystals having a nonlinear dielectric susceptibility and which is properly index matched so that mixing of two beams of frequencies $f_o$ and $f_p$ will generate energy at the sum frequency $f_o+p$.

Radiation of a frequency $f_o$ is directed by the object source 13 toward the entrance face 11 of the nonlinear material 10. The object 0, which is shown as an arrow located at the source 13, may be an actual object or a real or virtual image formed from an actual object by an optical system.

The pump source 12 includes a laser 15 and a moveable lens 16 having a focal point 18. A mirror 17 is mounted such that a virtual image of the focal point 18 as seen by the entrance face 11 lies in the plane of the object O, i.e. the distance $d_p$ is equal to the distance $d_o$ such that the rays coming from point 18 appear to the entrance face 11 to be radiating from point 19.

The object rays pass through mirror 17 onto the entrance face 11 of material 10. If the pump frequency $f_p$ is of a different frequency than the object frequency $f_o$, the mirror 17 could be a dichroic mirror which passes all radiation of the frequency $f_o$ and reflects radiation of the frequency $f_p$. If, however, $f_o$ and $f_p$ are equal, then a beam splitter or half-silvered mirror may be used as mirror 17. When used for night surveillance, $f_o$ and $f_p$ would most likely be equal, since the object O could be conveniently illuminated by the pump source 12 or a source similar to the pump source 12. Also, $f_o$ might represent the center frequency of some narrow band of IR frequencies being radiated by the object due to its temperature.

The filter 14 passes radiation at the sum of the pump and object frequencies $f_p$ and $f_o$. Radiation at the sum frequency $f_o+f_p$ is generated in nonlinear material 10 by the mixing of the pump and object radiation.

One of the basic requirements of the nonlinear crystal 10 is that it be index matched with respect to the object and pump radiation. Index matching is the process of choosing the crystal type and orientation such that the velocities in the crystal of the three waves, i.e. the pump, object, and the sum, be such that the interaction between the pump and object radiation can occur cumulatively over the entire thickness of the crystal 10. In order to satisfy the conservation of momentum requirements, the velocities of the waves must also satisfy the wavevector equation, $$\bar{K}_{0+p} = \bar{K}_p + \bar{K}_o$$

where $\bar{K}_{0+p}$ is the wavevector of the sum frequency $f_0+f_p$, $\bar{K}_p$ is the wavevector of the pump frequency $f_p$, and $\bar{K}_o$ is the wavevector of the object frequency $f_0$. The sum frequency $f_0+f_p$ is the result of the conservation of energy.

Resolution will depend on the effective size of the angular aperture presented to the rays $f_o$ by the entrance face 11 of the crystal. For each ray of a frequency $f_o$ coming from point 19 there will be a colinear ray of frequency $f_p$ at the entrance face 11. Therefore, with the material 10 properly index matched, as explained above, the effective size of the aperture, for rays coming from point 19, will be limited only by the geometry of the system or by the lateral extend of the material 10.

However, for radiation coming from other points on the object there will be an angle formed at the entrance face 11 between the pump ray $f_p$ and the object ray $f_0$. For example, the angle A in FIG. 1 is formed between one of the object rays $f_o$ coming from the arrowhead of object O and a corresponding pump ray $f_p$.

The size of the angle A will generally be different for different rays. For rays coming from a given point on the object O, the angle A will be a maximum when the object ray intersects the entrance face 11 at an angle equal to the angle of intersection of the corresponding pump ray and the entrance face. 11. This maximum angle A will be greatest for those points on the object O laterally spaced farthest from point 19. For example, the angle A as drawn in FIG. 1 is the largest of all possible angles formed between the object rays $f_o$ and the pump rays $f_p$, because the object ray $f_o$ is coming from the arrowhead on object O and because it intersects the entrance face 11 at the same angle as the corresponding pump ray $f_p$.

For a particular nonlinear material of given thickness there will be a limiting value for angle A, called the phase matching acceptance angle, beyond which interactions between $f_o$ and $f_p$ are attenuated. Therefore, if the angle A exceeds this limiting value for some of the object rays, then mixing in the nonlinear material 10 will be attenuated and the effective aperture for these points will be reduced with a corresponding degradation of resolution.

However, because the pump rays $f_p$ are arranged such that they appear to the entrance face 11 to be coming from the point source 19, the largest possible angle A is minimized. Since the largest possible angle A is minimized the resolution is optimized for a given material. In fact, if the angle A shown in FIG. 1 is less than the phase matching acceptance angle, resolution of the arrow head will be substantially the same as that of point 19. Also, since the angle A is minimized then the thickness of the nonlinear material 10 may be increased without degrading resolution.

FIG. 2 shows an arrangement wherein the object source 23 is an optical system having a lens 30 which forms a real image I of the object 0 and wherein the image I is located to the right of the nonlinear material 20. However, here again the object 0 may be actually a real or virtual image of same distant object.

The pump source 22 includes a laser 25 and a convergent lens 26 moveably mounted with respect to the laser output $f'_p$. As viewed from the entrance face 21, the rays $f'_o$ are radiating from point sources effectively located at the image I. Therefore, the lens 26 is adjusted with respect to the mirror or beam splitter 27 such that the convergent rays $f'_p$ would converge to the point 31 on the image I.

The largest possible angle between an object ray $f'o$ and a pump ray $f'_p$ at the entrance face 21 would be the angle A' formed between the object ray $f'_o$ associates with the arrow head and which intersects the entrance face 21 at an angle equal to the angle of intersection between the corresponding pump ray $f'_p$ and the entrance face 21. The angle A' drawn in FIG. 2 is the largest possible angle for the structure shown.

With the largest angle A' adjusted such that it is less than the phase matching acceptance angle of material 20, the size of the effective aperture presented by the entrance face 21 will be substantially the same for all points on the object O. Therefore, the resolution of the object as seen by an observer viewing the rays $f'_o+f'_p$ after passing filter 24 will be substantially the same for all points on the object 0 as it is for point 29.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. An image converter comprising an object source means for radiating energy at an object frequency; a pump source means for radiating energy at a pump frequency; a nonlinear mixing means for mixing radiation at said object and pump frequencies; means for directing radiation from said object and pump sources to said mixing means; and said last-mentioned means including means for focusing said radiations such that, at said mixing means, rays associated with one point at said object source means are parallel to the rays from said pump source means.

2. The device according to claim 1 and wherein said pump rays at said mixing means are spherical waves having a center of curvature located at the apparent location of said object source means.

3. The device according to claim 2 and wherein said pump source means includes a laser.

4. The device according to claim 2 and further including a filter means mounted at the output of said mixing means for passing energy at the sum of said pump and object frequencies.

5. An image converter comprising an object source means for radiating energy at an object frequency; a pump source means for radiating energy at a pump frequency; means for focusing said pump energy at a point; a nonlinear mixing means for mixing radiation at said object and pump frequencies; and means for forming a virtual image of said point at said object source means and for directing said object and pump radiation at said nonlinear mixing means.

6. The device according to claim 5 and wherein said pump source means includes a laser.

7. The device according to claim 5 and further including a filter means mounted at the output of said mixing means for passing energy at the sum of said pump and object frequencies.

8. An image converter comprising an object source means for radiating energy at an object frequency; imaging means for forming an image of said object source means at an image plane; a pump source having means for radiating energy at a pump frequency; a nonlinear mixing means mounted between said object source means and said image plane for mixing radiation at said object and pump frequencies; and means mounted between said nonlinear mixing means and said object source means for focusing said pump energy to a point at said image plane.

9. The device according to claim 8 and wherein said pump source means includes a laser.

10. The device according to claim 8 and further including a filter means mounted at the output of said mixing means for passing energy at the sum of said pump and object frequencies.

* * * * *